(12) United States Patent
Tatehata et al.

(10) Patent No.: US 7,039,279 B2
(45) Date of Patent: May 2, 2006

(54) OPTICAL FILTER MODULE AND MANUFACTURING METHOD THEREOF

(75) Inventors: Naoki Tatehata, Osaka (JP); Kazunari Nishihara, Osaka (JP); Tetsuro Shimamura, Kyoto (JP); Kazuo Fujiwara, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/471,419

(22) PCT Filed: Oct. 2, 2002

(86) PCT No.: PCT/JP02/10263

§ 371 (c)(1),
(2), (4) Date: Sep. 11, 2003

(87) PCT Pub. No.: WO03/032031

PCT Pub. Date: Apr. 17, 2003

(65) Prior Publication Data

US 2004/0120650 A1    Jun. 24, 2004

(30) Foreign Application Priority Data

Oct. 4, 2001    (JP) ............................ 2001-308311

(51) Int. Cl.
*G02B 6/30*    (2006.01)

(52) U.S. Cl. ......................................... 385/49; 385/14
(58) Field of Classification Search ................. 385/49, 385/14, 137
See application file for complete search history.

(56) References Cited

U.S. PATENT DOCUMENTS

| 4,958,897 | A |   | 9/1990 | Yanagawa et al. |
| 5,438,640 | A | * | 8/1995 | Sasaoka et al. ................ 385/43 |
| 6,085,000 | A |   | 7/2000 | Tanaka et al. |
| 6,350,064 | B1 | * | 2/2002 | Mitsuda et al. ................ 385/88 |
| 6,445,849 | B1 | * | 9/2002 | Kinoshita et al. .............. 385/24 |

FOREIGN PATENT DOCUMENTS

| JP | 64-34604 |   | 3/1989 |
| JP | 1-213606 A | * | 8/1989 |
| JP | 2-284103 |   | 11/1990 |
| JP | 6-34837 |   | 2/1994 |
| JP | 7-5346 |   | 1/1995 |
| JP | 7-281049 |   | 10/1995 |
| JP | 8-184712 |   | 7/1996 |
| JP | 8-211228 |   | 8/1996 |
| JP | 8-297214 |   | 11/1996 |
| JP | 9-105824 |   | 4/1997 |
| JP | 10-48439 |   | 2/1998 |
| JP | 10-133041 A | * | 5/1998 |
| JP | 10-307221 |   | 11/1998 |

* cited by examiner

*Primary Examiner*—Sung Pak
*Assistant Examiner*—Mike Stahl
(74) *Attorney, Agent, or Firm*—Wenderoth, Lind & Ponack, L.L.P.

(57) ABSTRACT

An optical filter module of the present invention has a flat substrate, an optical path formed on the flat substrate; a filter insertion groove provided, crossing the optical path, on the flat substrate; a multilayer filter inserted, dividing the optical path, into the filter insertion groove; and a pair of covers disposed on the flat substrate so as to sandwich the multilayer filter. The present invention enables the omission of the process of adjustment of the optical axis, thus achieving high operability. At the same time, the present invention ensures fixing and mounting of the multilayer filter even if the multilayer filter is warped.

6 Claims, 9 Drawing Sheets

US 7,039,279 B2

OPTICAL FILTER MODULE AND MANUFACTURING METHOD THEREOF

TECHNICAL FIELD

The present invention relates to optical filter modules for optical communications in which multilayer filters are integrated with an optical fiber and an optical waveguide, and their manufacturing methods.

BACKGROUND ART

A conventional method of manufacturing a module in which multilayer filters are integrated with an optical fiber and optical waveguide is described next with reference to FIG. 9. First, optical fiber 20 is provisionally secured onto metal housing 23, and condenser lens 21 for focusing light diffused from optical fiber 20 and multilayer filter 22 are mounted. Then, an optical signal is fed from optical fiber 20a at the input side. The optical signal from optical fiber 20b at the output side is measured, such as by a power meter, to adjust the optical axis and achieve the maximum optical signal. After adjustment, condenser lens 21 and multilayer filter 22 are caulked and fixed onto metal housing 23.

Accordingly, optical axis adjustment is required at 4 points when manufacturing the conventional module in which multilayer filter 22 is integrated with an optical path: (1) Optical axis adjustment between input optical fiber 20a and condenser lens 21, (2) Optical axis adjustment between condenser lens 21 and multilayer filter 22, (3) Optical axis adjustment between multilayer filter 22 and condenser lens 21, and (4) Optical axis adjustment between condenser lens 21 and output optical fiber 20b. Operability is thus poor in the prior art.

SUMMARY OF THE INVENTION

To solve the above disadvantage, an optical filter module of the present invention has a flat substrate, and an optical path formed on the flat substrate; a filter insertion groove provided, crossing the optical path, on the flat substrate; a multilayer filter inserted, dividing the optical path, into the filter insertion groove; and a pair of covers disposed on the flat substrate so as to sandwich the multilayer filter. The present invention enables the omission of the process of adjustment of the optical axis, thus achieving high operability. At the same time, the present invention ensures fixing and mounting of the multilayer filter even if the multilayer filter is warped.

DETAILED DESCRIPTION OF PREFERRED EMBODIMENT(S)

An optical filter module and its manufacturing method of the present invention are described below with reference to exemplary embodiments.

FIRST EXEMPLARY EMBODIMENT

The optical filter module of the present invention is detailed below with reference to FIGS. 1A to 1C and FIGS. 2A to 2D.

Figure 1A:
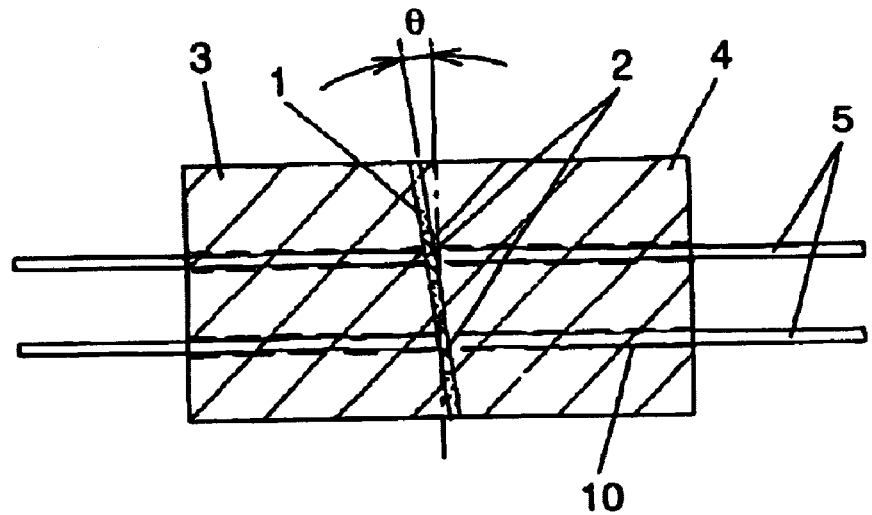
FIG. 1A is a top view of a structure of an optical filter module in accordance with a first exemplary embodiment of the present invention.
Figure 1B:
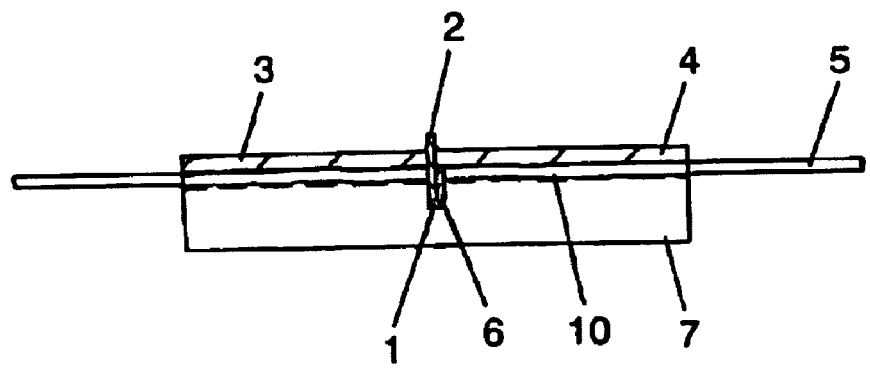
FIG. 1B is a side view of the optical filter module in accordance with the first exemplary embodiment of the present invention.
Figure 1C:
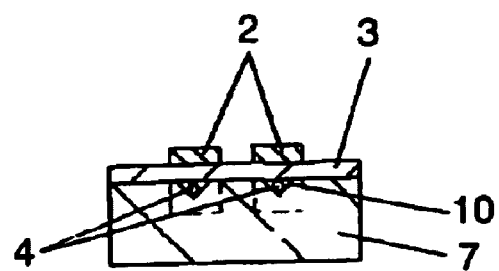
FIG. 1C is a sectional view of the optical filter module in accordance with the first exemplary embodiment of the present invention.

FIG. 1A is a top view of a two-core optical filter module, FIG. 1B is its side view, and FIG. 1C is its sectional view. Filter insertion groove 1 for multilayer filter, multilayer filter 2, cover 3 bonded to a flat substrate, cover 4 for press-holding multilayer filter 2, optical path 5, optical adhesive 6, and flat substrate 7 are indicated in FIGS. 1A to 1C.

Multilayer filter 2 is made by laminating thin dielectric films, typically made of $SiO_2$ or $Ta_2O_5$, on a glass or resin substrate made typically of polyimide. Cover 3, cover 4, and flat substrate 7 are typically made of glass or silicon, preferably a material having a linear expansion coefficient close to that of optical path 5. However, if resin adhesive is used for fixing these members, any stress due to the difference in linear expansion coefficient can be absorbed by the elasticity of the adhesive. If a photocurable material is used as the adhesive, a material that has the property of transmitting light is preferably used.

For optical adhesive 6, a material which has a refractive index equivalent to that of the material used for optical path 5 is preferable to prevent dispersion of the light from the end face of the optical path. For example, if optical path 5 is made of silica glass, a material which has a refractive index as close as possible to that of silica glass, i.e., 1.45, is preferably selected as the optical adhesive. In the first exemplary embodiment, an optical fiber is used for optical path 5. V-groove 10 is created on flat substrate 7 to mount and fix optical fiber 5. Optical fiber 5 is sandwiched by cover 3 and flat substrate 7, which are disposed on the top and bottom of optical fiber 5, by providing a predetermined depth and angle for V-groove 10.

This enables the mounting of optical fiber 5 without any positional deviation. This V-groove 10 can also be formed on cover 3 and cover 4. The center of optical fiber 5 is positioned right on the surface of cover 3 and flat substrate 7 by setting depth d of V-groove 10 to:

$$d = r/\sin(\alpha/2)$$

where α is the tip angle of V-groove 10 and r is the radius of the optical fiber to be mounted. If the optical fiber with a Clad diameter of 125 µm is used as optical path S, the depth of V-groove 10 is processed to about 180 µm when the tip angle of V-groove 10 is 90°. This design ensures anchoring of optical fiber 5 by sandwiching optical fiber 5 between covers 3 or 4 and flat substrate 7.

The depth and angle of the V-groove created on covers 3 and 4 and those of V-groove 10 created on flat substrate 7 are not necessarily equal. The optical fiber can be securely mounted and fixed using covers 3 and 4 and flat substrate 7 by setting the angle and depth of the V-groove created on flat substrate 7, which sandwiches the optical fiber, to greater than the length of protrusion of the optical fiber from the surface of flat substrate 7 when the optical fiber is mounted in V-groove 10 of flat substrate 7. In other words, if the optical fiber protrudes from the surface of flat substrate 7, the optical fiber is sandwiched by V-groove created on flat substrate 7 and the groove created on the covers. Filter insertion groove 1 on flat substrate 7 is created such that it is tilted to a predetermined angle θ with respect to optical path 5 configured with the optical fiber. This is formed when it is necessary to prevent reflection of the light entering from optical path 5 onto multilayer filter 2. For example, this is formed when multilayer filter 2 is a bandpass filter or gain-flattening filter used in optical amplifiers. In this case, tilting angle θ is preferably 5 to 10° for guiding the light with wavelength of 1.48 µm through a single mode fiber (SMF); however, the angle depends on the wavelength of the light to be guided.

Moreover, coupling loss between the optical fiber and multilayer filter 2 can be reduced by employing an expanded Core fiber having a partially enlarged core that confines and guides the light in the optical fiber.

In the optical fiber module of the present invention, filter insertion groove 1 is created so as to cross optical path 5, and multilayer filter 2 is inserted in this filter insertion groove 1. This means the path for the optical fiber is divided by filter insertion groove 1, and thus gap G of the width of filter insertion groove 1 exists between the end faces of the optical fiber via multilayer filter 2. If spot size w of the light is the same at the end faces of the optical fiber, power transmission coefficient Tg of the optical electric field between end faces of the optical fiber via gap length G is expressed by equation (1) as follows:

$$Tg = \{1 + (\lambda \times G/(2 \times p \times n \times w^2))^2\}^{-1} \quad \text{(Equation 1);}$$

where
n: Refractive index of multilayer filter 2; and
λ: Wavelength.

Equation (1) shows that Tg is made smaller by increasing wavelength λ or gap length G. On the other hand, Tg approaches 1 by increasing spot size w. Accordingly, the transmission coefficient becomes greater as spot size w on the end face of the optical fiber exposed on the wall surface of filter insertion groove 1 becomes larger, reducing transmission loss.

A range of methods is proposed for the expanded Core fiber. One typical example is a TEC (Thermally Expanded Core) fiber. This is a special fiber in which the core diameter is practically expanded by diffusing a doping element which controls the refractive index of the Core, such as $GeO_2$, some distance into the Clad by heating that part of the Clad. The use of this fiber enables the expansion of the spot size of the light from the fiber end face. If this expanded Core fiber is used for the optical filter module of the present invention, filter insertion groove 1 is processed and created so as to cross the maximum portion of the expanded Core in optical path 5.

Figure 2A:
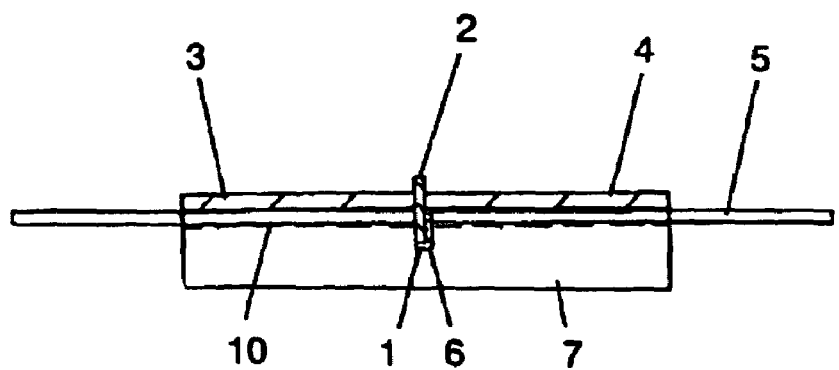
FIGS. 2A to 2D are sectional views illustrating a shape of a filter insertion groove in the structure of the optical filter module in accordance with the first exemplary embodiment of the present invention.
Figure 2B:
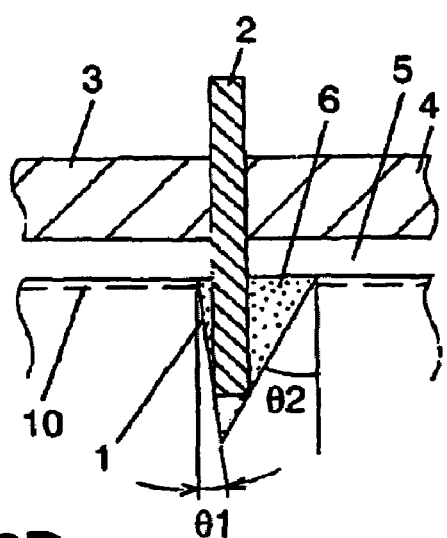
Figure 2C:
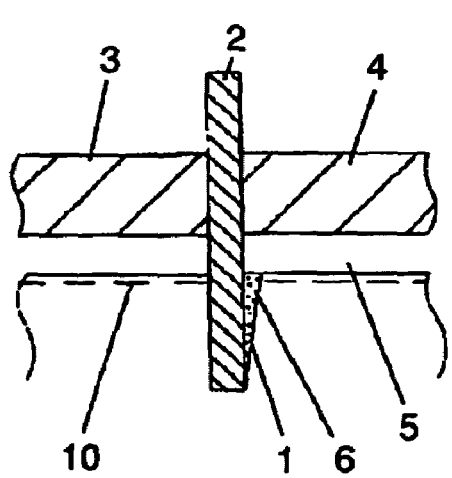
Figure 2D:
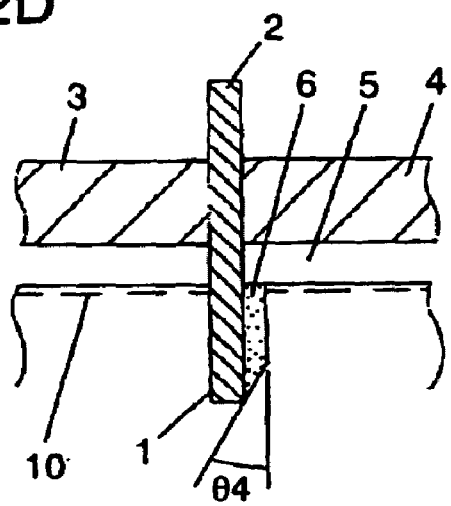

Various shapes can be used for filter insertion groove 1, as shown in FIGS. 2B, 2C, and 2D. In any case, filter insertion groove 1 has a shape such that it is shallow at one groove wall and deep at the other groove wall at the bottom. FIG. 2B shows the case where the first groove wall of filter insertion groove 1 is tilted to angle θ1 while the second groove wall has a predetermined angle θ2 with respect to the first groove up to the surface of the flat substrate at the bottom. FIG. 2C shows the case where a flat portion is formed on a part of the bottom of filter insertion groove 1. FIG. 2D shows the case where a flat portion is formed on a part of the bottom of filter insertion groove 1, and a perpendicular portion on the top part and tapered portion (angle θ4) on the bottom part are formed at one groove wall.

These filter insertion grooves 1 are, for example, formed by a diamond grinder whose tip is processed in advance to generate the groove shape. In other words, the tip shape of the diamond grinder is transferred to the groove shape. Accordingly, the groove shape after processing largely depends on the grinding accuracy of the diamond grinder. If the grinder width is 0.1 mm or less, processing is difficult due to the limitation of the diamond particle diameters. If the grinder width is 0.1 mm or above, processing is relatively easy.

The reason for processing filter insertion groove 1 into an irregular shape with tilting angle on one side wall different from the tilting angle on the other side wall as shown in FIGS. 2B to 2D is to prevent tilting of multilayer filter 2 after insertion. In addition, if filter insertion groove 1 is created using one end face of cover 3 mounted in advance as the reference face during the manufacturing method described later, degradation of grinding accuracy of filter insertion groove 1 due to meandering of the diamond grinder is preventable because the force is applied in a way such as to press the diamond grinder for processing towards flat substrate 7 which works as the reference face. The above description refers to the case of two optical fibers. It is apparent that the same applies to three or more fibers or fiber arrays.

The first exemplary embodiment refers to the case where optical path 5 is the optical fiber, but the same applies to other optical paths such as optical waveguides.

The present invention also typically refers to a bandpass filter and gain-flattening filter used in optical amplifiers. It is apparent that the present invention is also applicable to other modules such as wavelength multiplexers and demultiplexers.

Furthermore, the present invention refers to lamination of multiple layers of thin dielectric films such as $SiO_2$ or $Ta_2O_5$ on a glass or resin substrate such as polyimide. However, the present invention is not limited to these materials.

SECOND EXEMPLARY EMBODIMENT

A method of manufacturing an optical filter module of the present invention is described next with reference to FIGS. 3A to 3G and 4A to 4F.

Filter insertion groove 1, multilayer filter 2, cover 3 bonded to flat substrate, cover 4 for press-holding multilayer filter 2, optical fiber 5 as an optical path, optical adhesive 6, flat substrate 7, and precise V-groove 10 created on the surface of flat surface 7, and UV ray 11 are indicated in FIGS. 3A to 3G.

Figure 3A:
FIGS. 3A to 3G are sectional views illustrating a method of manufacturing an optical filter module in accordance with a second exemplary embodiment of the present invention.

In the method of manufacturing the optical filter module of the present invention, precise V-groove 10 is created on the surface of flat substrate 7 in a first step shown in FIG. 3A.

Figure 3B:
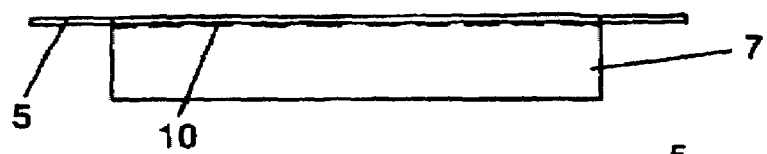

Next, in a second step, optical fiber 5 is mounted and fixed on flat substrate 7 as shown in FIG. 3B. A mounted portion of optical fiber 5 is preferably the Clad portion where a covering over the Clad is removed in order to secure the mounting accuracy. The angle and depth of V-groove 10 are set in advance such that optical fiber 5 when mounted and fixed protrudes from the surface of flat substrate 7. This facilitates positioning of cover 3 by using protruding optical fiber 5 as a guide rail.

In addition, the use of an expanded Core fiber as optical fiber 5 enlarges the spot size on the end face of optical fiber 5, reducing transmission loss and coupling loss between optical fibers 5.

Figure 3C:
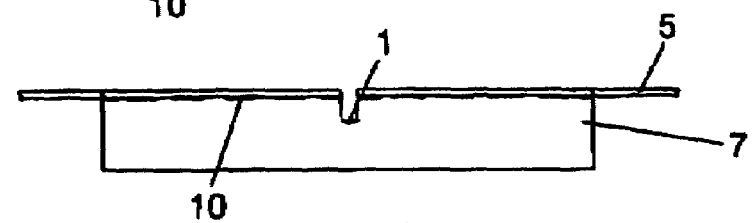

In a third step, as shown in FIG. 3C, filter insertion groove 1 is created on the surface of flat substrate 7, on which optical fiber 5 is mounted and fixed, in a way such that filter insertion groove 1 crosses optical fiber 5. If the expanded Core fiber is used for optical fiber 5, filter insertion groove 1 is created such that groove 1 crosses the maximum portion of the expanded Core. Filter insertion groove 1 is, for example, ground using a grinder which employs c-BN (cubic boron nitride) or diamond formed into a groove shape as abrasive grains. Alternatively, powder processing, such as using blast, is also applicable. If silicon is used as a material for the flat substrate, a groove can also be created by wet etching or dry etching.

As described in the first exemplary embodiment, the use of a grinder is more advantageous since it offers more flexibility in shape for processing the section face of filter insertion groove 1 into an irregular shape. Moreover, since the formation of filter insertion groove 1 and division of optical fiber 5 are implemented simultaneously, abrasive grain for machining should be preferably as small as possible for improving the surface roughness of the end face of cut and divided optical fiber 5. The present invention thus uses a diamond grinder for creating filter insertion groove 1. A mirror-like end face of optical fiber 5 is mostly achieved by selecting a diamond grinder of #3000 or finer abrasive grains.

In the above step, optical fiber 5 is cut and filter insertion groove 1 is created at the same time after mounting and fixing optical fiber 5 on flat substrate 7, eliminating the optical axis adjustment between the optical fiber for input light and optical fiber for output light. The manufacturing time can thus be reduced.

Moreover, if the reflection of the light on the surface of multilayer filter 2 needs to be prevented in the case that multilayer filter 2 is a bandpass filter or gain-flattening filter used in an optical amplifier, optical fiber 5 and filter insertion groove 1 are formed so as to cross at a predetermined angle. Although the angle depends on the wavelength of the light used, the crossing angle is preferably from 5 to 10°.

Figure 3D:
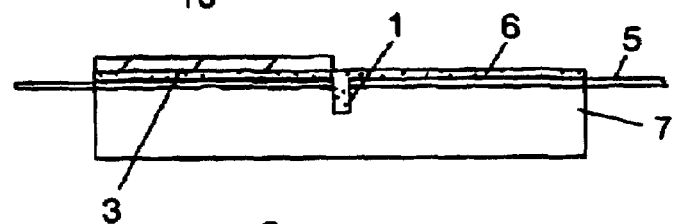

Next, in a fourth step, as shown in FIG. 3D, optical adhesive 6 is applied to the entire surface of flat substrate 7, and then cover 3 is attached, aligned with the end face of filter insertion groove 1. Here, optical adhesive 6 is applied to fill the inside of filter insertion groove 1 formed in the previous step. Coupling loss between fibers can be reduced by using adhesive having refractive index equivalent to that of the Core material of optical fiber 5.

Figure 3E:
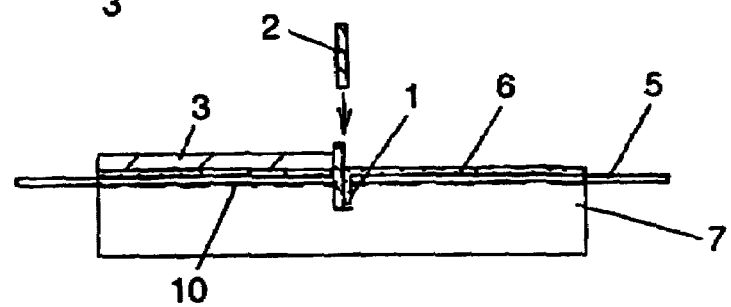

Next, in a fifth step, as shown in FIG. 3E, multilayer filter 2 is inserted into filter insertion groove 1 containing optical adhesive 6. Here, one end face of cover 3 is mounted aligned to a side face of filter insertion groove 1 so that multilayer filter 2 to be inserted can be mounted and fixed in alignment with one side face of filter insertion groove 1. The size of multilayer filter 2 is set such that the top part of inserted multilayer filter 2 always protrudes from the surface of flat substrate 7. The protruding length of multilayer filter 2 is preferably at least half or more of the thickness of cover 3. It is even more preferable that the protruding length is longer than the thickness of cover 3. In FIG. 3, the protruding length of multilayer filter 2 is more than the thickness of cover 3. The top part of multilayer filter 2 thus protrudes from the surface of cover 3.

Figure 3F:
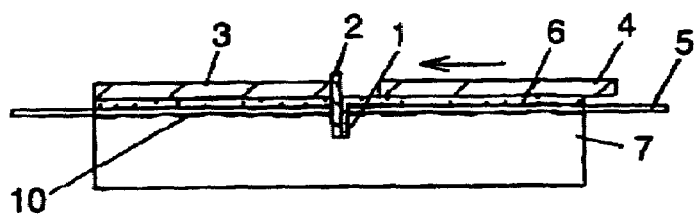

Next, in a sixth step, as shown in FIG. 3F, cover 4 is moved from the opposite side of cover 3 toward multilayer filter 2 to sandwich multilayer filter 2 inserted into filter insertion groove 1. If one face of multilayer filter 2 is aligned to the side face of cover 3 and filter insertion groove 1, cracking of multilayer filter 2 is preventable when multilayer filter 2 is sandwiched and fixed by the other cover 4. Since multilayer filter 2 is sandwiched by the protruding portion, warpage is correctable by making the protruding length longer and broadening the area to be sandwiched by covers 3 and 4, if multilayer filter 2 is warped. In addition, the use of glass as a substrate of multilayer filter 2 is effective in preventing cracking due to stress, since glass has a large elastic modulus. A V-groove can also be formed on the surfaces of covers 3 and 4. The angle and depth of these V-grooves are determined as required based on the protruding length of multilayer filter 2. If the V-groove is created on the surface of covers 3 and 4, attachment of covers 3 and 4 using optical fiber 5 as a guide rail is facilitated.

Figure 3G:
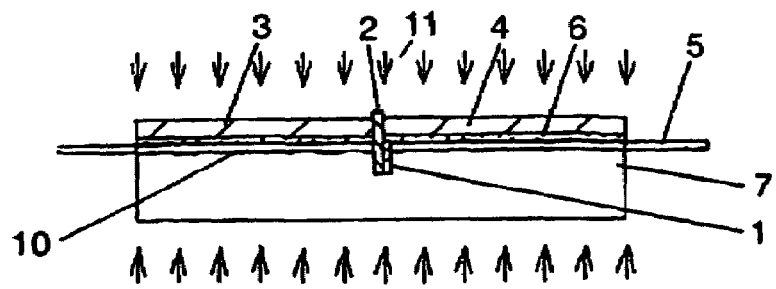
Figure 4A:
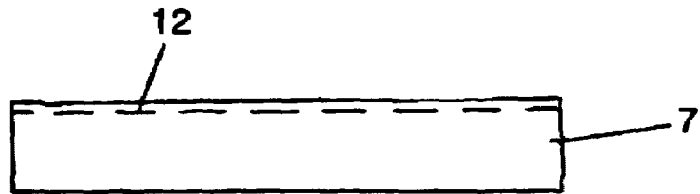
FIGS. 4A to 4F are sectional views illustrating a method of manufacturing the optical filter module in accordance with the second exemplary embodiment.
Figure 4B:
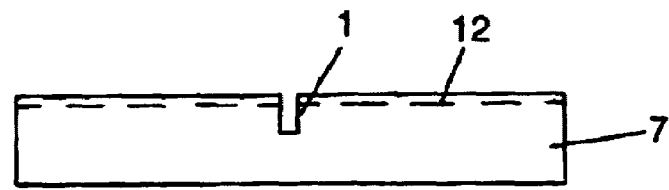
Figure 4C:
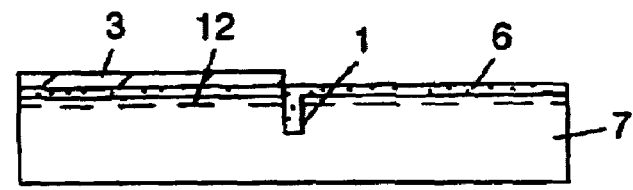
Figure 4D:
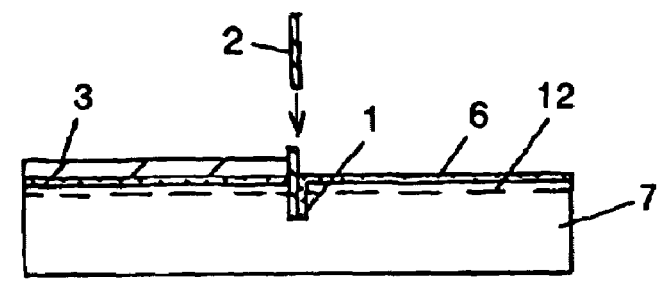
Figure 4E:
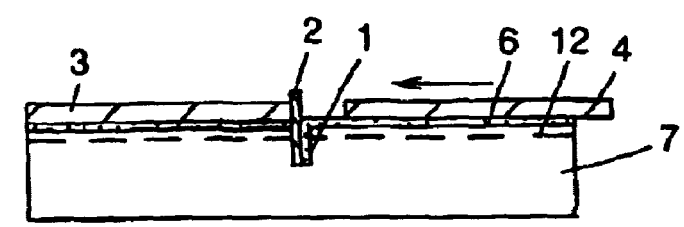
Figure 4F:
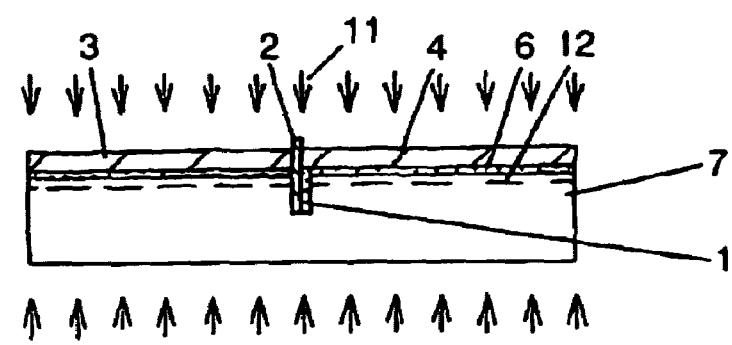

Lastly, in a seventh step, as shown in FIG. 3G, UV ray 11 is irradiated from one or both sides of covers 3 and 4 and flat substrate 7 to cure optical adhesive 6, completing the optical filter module. The use of light is effective for reducing the manufacturing time, and thus an optical adhesive suitable for the purpose is used. As for the optical adhesive, acrylic resin or epoxy resin of UV-curing type is applicable. However, the present invention is not limited to photocurable adhesive. Thermosetting adhesive is also applicable.

As for covers 3 and 4 and flat substrate 7, a material which has the same linear expansion coefficient as that of optical fiber 5, which is mounted and fixed in the later step, is preferable. It is also preferable to choose a material with optical transparency, taking into account the use of photocurable adhesive for fixing covers 3 and 4 and flat substrate 7.

The above description refers to an example of using optical fiber for optical path 5. The same applies to other optical paths such as optical waveguides. A manufacturing method for the case when optical path 5 is the optical waveguide is shown in FIGS. 4A to 4F.

Steps shown in FIGS. 3A to 3G use an optical fiber for optical path 5, whereas steps shown in FIGS. 4A to 4F use an optical waveguide directly created on flat substrate 7 for optical path 5. The optical waveguide is manufactured using conventional methods.

Since filter insertion groove 1 is created at the same time as dividing optical waveguide 12, the need to adjust the optical axis of the optical waveguide for input light and the optical waveguide for output light can be eliminated. Moreover, the manufacturing time can be reduced, because the formation of filter insertion groove 1 and division of optical waveguide 12 are executed simultaneously.

In FIGS. 3 and 4, multilayer filter 2 refers to a bandpass filter or gain-flattening filter used in an optical amplifier. The present invention is also applicable to various optical filters.

Multilayer filter 2 is, for example, made by laminating many layers of a thin dielectric film such as $SiO_2$ or $Ta_2O_3$ on a glass or a resin substrate such as polyimide. However, multilayer filter 2 of the present invention is not limited to these materials.

THIRD EXEMPLARY EMBODIMENT

A method of manufacturing an optical filter module in a third exemplary embodiment of the present invention is described next with reference to FIGS. 5A to 5G, 6A to 6F, 7A to 7F and 8A to 8G.

Filter insertion groove 1, multilayer filter 2, cover 3 bonded to a flat substrate, cover 4 for press-holding multilayer filter 2, optical fiber 5 as an optical path, optical adhesive 6, flat substrate 7, precise V-groove 10 created on the surface of flat substrate 7, and UV ray 11 are indicated in FIGS. 5A to 5G.

Figure 5A:
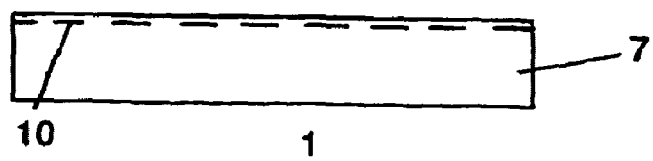
FIGS. 5A to 5G are sectional views illustrating a method of manufacturing an optical filter module in accordance with a third exemplary embodiment of the present invention.

In the method of manufacturing an optical filter module of the present invention, precise V-groove 10 is created on the surface of flat substrate 7 in a first step, as shown in FIG. 5A. Flat substrate 7 is preferably made of a material having a linear expansion coefficient equivalent to that of optical fiber 5 which is mounted and fixed in a later step.

Figure 5B:

Next, in a second step, as shown in FIG. 5B, filter insertion groove 1 is created, and optical fiber 5 is mounted and secured onto precise V-groove 10 created on the surface of flat substrate 7. Instead, optical fiber 5 can be mounted first and then filter insertion groove 1 is formed. Alternatively, optical fiber 5 can be cut while forming filter insertion groove 1. Mirror processing of a cut section of optical fiber 5 is effective for reducing the coupling loss between optical fibers 5. If the cut section is left as it is for use, cutting conditions need to be carefully considered. If optical fiber 5 is cut using a diamond grinder, it is necessary to select a grinder with small abrasive grain to make the cut end face of optical fiber 5 close to a mirror-like finish. The present invention uses a diamond grinder for creating filter insertion groove 1. A diamond grinder of #3000 or finer abrasive grains is chosen for achieving an approximately mirror-like end face of optical fiber 5. A mounted and fixed portion of optical fiber 5 is preferably the Clad portion where the covering, such as resin coating is removed in order to secure the mounting accuracy.

The use of an expanded Core fiber as optical fiber 5 enlarges the spot size on the end face of optical fiber 5, reducing transmission loss and coupling loss between optical fibers 5.

Filter insertion groove 1 is, for example, ground using a grinder which employs c-BN (cubic boron nitride) or diamond formed into a groove shape as abrasive grains. Alternatively, powder processing, such as using blast, is also applicable. If silicon is used as a material for the flat substrate, a groove can also be created by wet etching or dry etching. As described in the first exemplary embodiment, the use of a grinder is more advantageous since it offers more flexibility in shape for processing the section face of filter insertion groove 1 into an irregular shape.

Figure 5C:
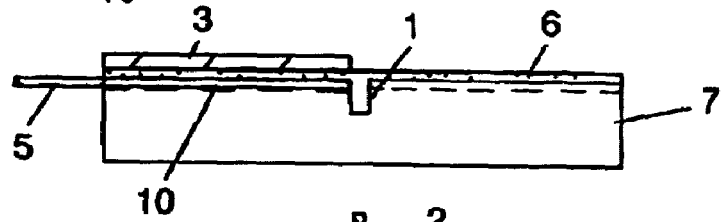

Next, in a third step, as shown in FIG. 5C, optical adhesive 6 is applied to the entire surface of flat substrate 7, and then cover 3 is attached, aligned with the end face of filter insertion groove 1. Here, optical adhesive 6 is applied to fill the inside of filter insertion groove 1 formed in the previous step. Coupling loss between fibers can be reduced by using optical adhesive 6 having refractive index equivalent to that of the Core material of optical fiber 5 to be used. A V-groove can also be created on cover 3. The angle and depth of V-groove 10 are set such that optical fiber 5 when mounted and fixed protrudes from the surface of flat substrate 7. This facilitates positioning of cover 3 by using protruding optical fiber 5 as a guide rail. If the side face of cover 3 is aligned to the side face of filter insertion groove 1, multilayer filter 2 inserted in a next step can be mounted and fixed by aligning multilayer filter 2 to one side face of filter insertion groove 1. It is advantageous for preventing cracking of multilayer filter 2 when multilayer filter 2 is fixed by the other cover 4.

Figure 5D:
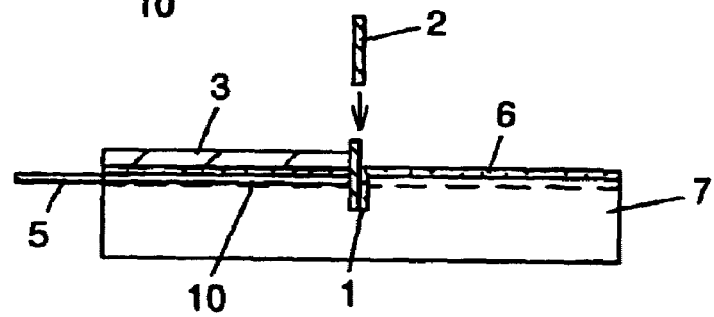

Next, in a fourth step, as shown in FIG. 5D, multilayer filter 2 is inserted into filter insertion groove 1 containing optical adhesive 6. The size of multilayer filter 2 is set such that the top part of inserted multilayer filter 2 always protrudes from the surface of flat substrate 7. The protruding length of multilayer filter 2 is preferably at least half or more of the thickness of cover 3. It is even more preferable that the protruding length is longer than the thickness of cover 3. In FIG. 5 the top part of multilayer filter 2 protrudes from the surface of flat substrate 7 by more than the thickness of cover 3. The top part of multilayer filter 2 thus protrudes from the surface of cover 3.

Figure 5E:
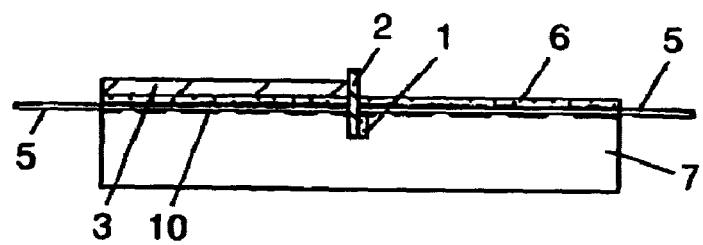

In a fifth step, as shown in FIG. 5E, optical fiber 5 is provided aligned to precise V-groove 10 created on the surface of flat substrate 7 as a guide rail. This enables the contact of the end face of optical fiber 5 to the surface of inserted multilayer filter 2, further reducing transmission loss and coupling loss between optical fibers 5.

Figure 5F:
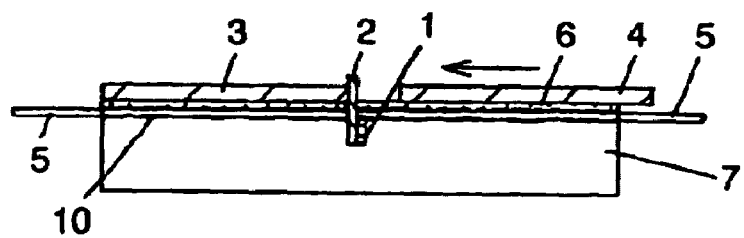

In a sixth step, as shown in FIG. 5F, cover 4 is moved from the other side of cover 3, and fixed, being pressed against multilayer filter 2 inserted in filter insertion groove 1. Cover 4 is pressed and fixed at a protruding portion of multilayer filter 2. If multilayer filter 2 is warped, the warpage is correctable by increasing the protruding length so as to expand the area to sandwich with covers 3 and 4. The use of glass as the substrate of the multilayer filter 2 is effective for preventing cracking caused by stress since glass has a large elastic modulus. A V-groove can also be formed on covers 3 and 4. In this case, the angle and depth of the V-groove are set as required based on the protruding length of optical fiber 5.

Figure 5G:
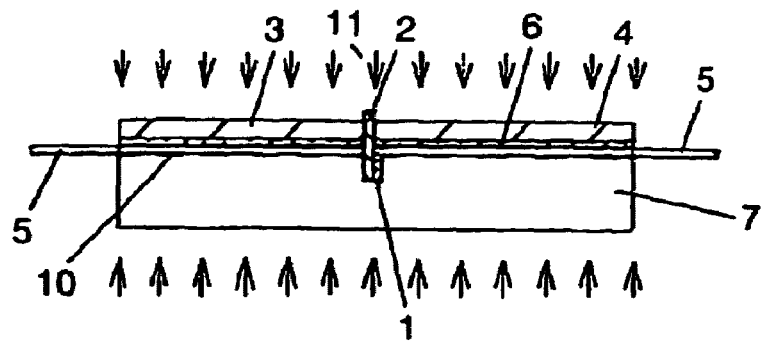

Lastly, in a seventh step, as shown in FIG. 5G, light such as UV ray is irradiated or heat is applied from one or both sides of covers 3 and 4 and flat substrate 7 for curing the adhesive to complete the multilayer filter module. It is preferable to choose a material with optical transparency for flat substrate 7 and covers 3 and 4, taking into account the use of photocurable adhesive for fixing covers 3 and 4 and flat substrate 7.

As described above in the manufacturing method of the present invention, cover 3 in which optical fiber 5 is mounted is prepared in advance. This eliminates the need for providing separate steps of applying optical adhesive 6, inserting multilayer filter 2, and fixing multilayer filter 2 by cover 3. Manufacturing control is thus facilitated.

Figure 6A:
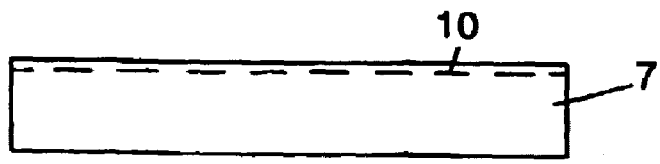
FIGS. 6A to 6F are sectional views illustrating a method of manufacturing an optical filter module in accordance with the third exemplary embodiment of the present invention.

Next, in a manufacturing method shown in FIGS. 6A to 6F, a precise V-groove 10 is created on the surface of flat substrate 7 in a first step, as shown in FIG. 6A. Flat substrate 7 is preferably made of a material that has a linear expansion coefficient equivalent to that of optical fiber 5 mounted and fixed in a later step.

Figure 6B:
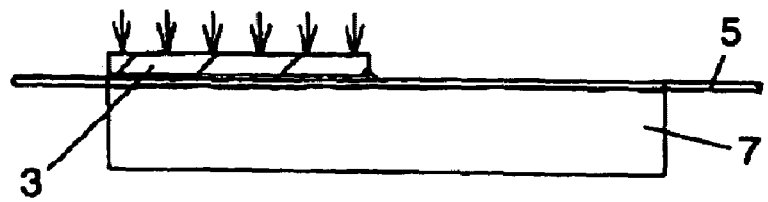

Next, in a second step, optical fiber 5 is mounted and fixed on flat substrate 7, and cover 3 is attached, as shown in FIG. 6B. A mounted portion of optical fiber 5 is preferably the Clad portion where the covering is removed in order to secure the mounting accuracy. The angle and depth of V-groove 10 are set such that optical fiber 5 when mounted and fixed protrudes from the surface of flat substrate 7. This facilitates positioning of cover 3 by using protruding optical fiber 5 as a guide rail.

The use of an expanded Core fiber as optical fiber 5 enlarges the spot size on the end face of optical fiber 5, reducing transmission loss and coupling loss between optical fibers 5. When optical adhesive is used, cover 3 can also be fixed by irradiating typically UV ray or applying heat from one or both sides of cover 3 and flat substrate 7 so as to cure the adhesive. In this exemplary embodiment, photocurable optical adhesive is used, and the light is irradiated so as to cure the adhesive. It is preferable to choose a material with optical transparency for flat substrate 7 and cover 3, taking into account the use of photocurable adhesive for fixing.

Figure 6C:
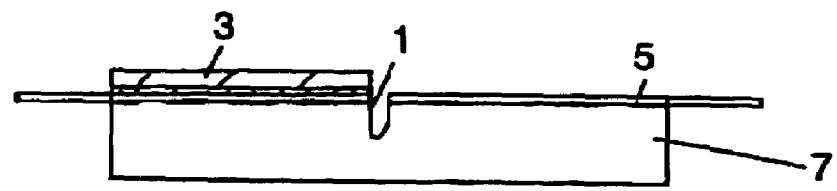

In a third step, as shown in FIG. 6C, filter insertion groove 1 is created on the surface of flat substrate 7, where optical fiber 5 is mounted and fixed, in a way such that filter insertion groove 1 crosses optical fiber 5. If the expanded Core fiber is used for optical fiber 5, filter insertion groove 1 is created such that groove 1 crosses the maximum core portion of the expanded Core. Filter insertion groove 1 is, for example, ground using a grinder which employs c-BN (cubic boron nitride) or diamond formed into a groove shape as abrasive grains. Alternatively, powder processing, such as using blast, is also applicable. If silicon is used as a material for the flat substrate, a groove can also be created by wet etching or dry etching.

As described in the first exemplary embodiment, the use of a grinder is more advantageous since it offers more flexibility in shape for processing the section face of filter insertion groove 1 into an irregular shape. Moreover, since the formation of filter insertion groove 1 and division of optical fiber 5 are implemented simultaneously, abrasive grain used for machining is preferably as small as possible for improving the surface roughness of the end face of cut and divided optical fiber 5.

The present invention thus uses a diamond grinder for creating filter insertion groove 1. A mirror-like end face of optical fiber 5 is mostly achieved by selecting a diamond grinder of #3000 or finer abrasive grains. Filter insertion groove 1 can be created aligned with the end face of cover 3. Alternatively, a part of cover 3 can be cut as filter insertion groove 1 is created.

In the above step, optical fiber 5 is cut and film insertion groove 1 is created at the same time after mounting and fixing optical fiber 5 on flat substrate 7. This eliminates the optical axis adjustment between the optical fiber for input light and optical fiber for output light, and also reduces the manufacturing time. If cover 3 is cut simultaneously, positioning of cover 3 and end face of filter insertion groove 1 is also eliminated, allowing further reduction of the time.

Figure 6D:
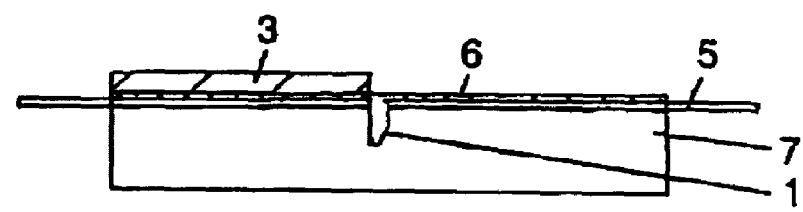
Figure 6E:
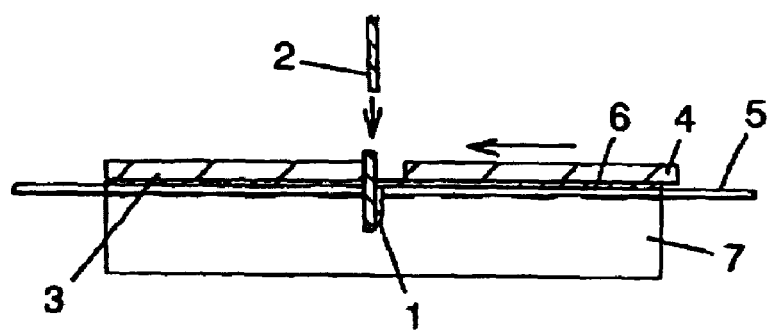
Figure 6F:
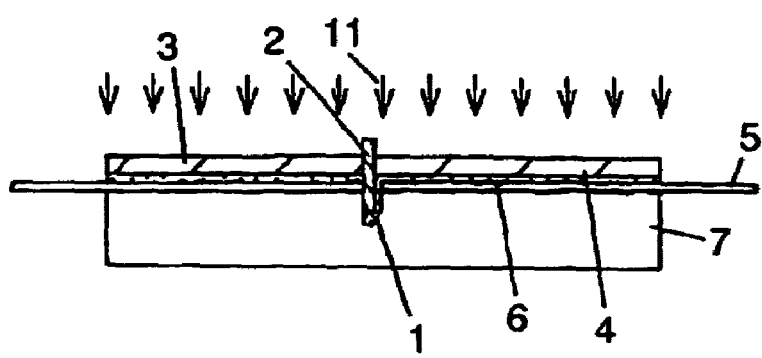
Figure 7A:
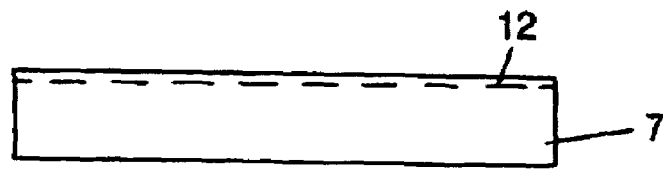
FIGS. 7A to 7F are sectional views illustrating a method of manufacturing an optical filter module in accordance with the third exemplary embodiment of the present invention.
Figure 7B:
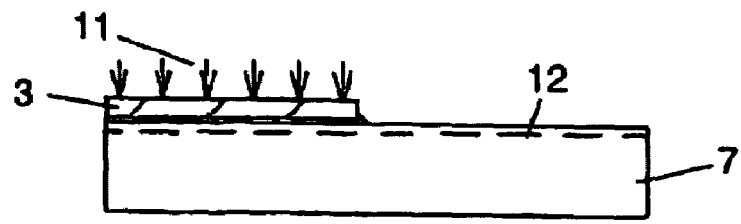
Figure 7C:
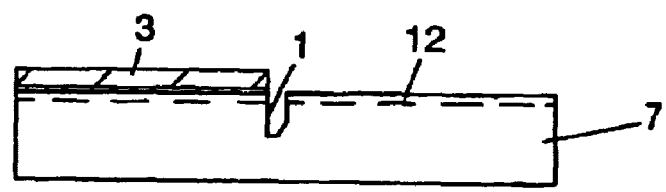
Figure 7D:
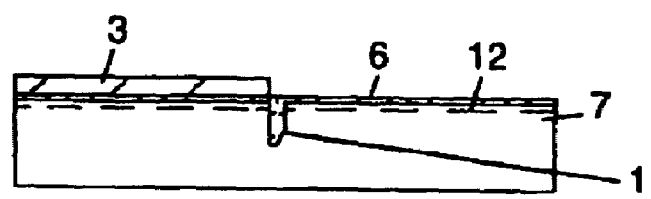
Figure 7E:
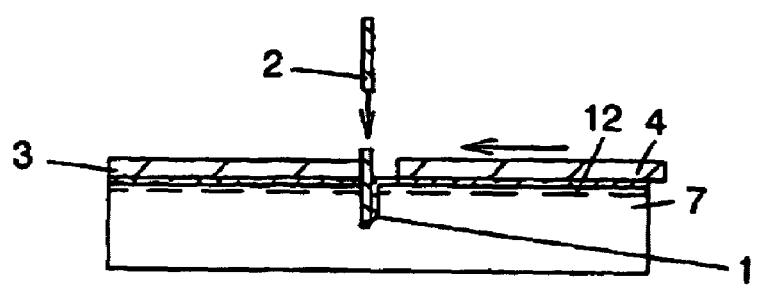
Figure 7F:
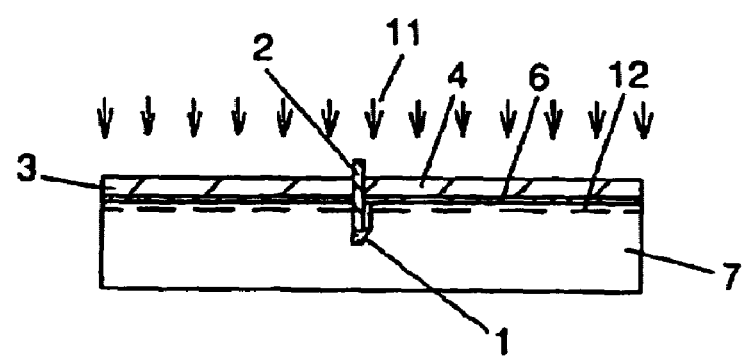

Next, in a fourth step, as shown in FIG. 6D, optical adhesive 6 is applied to the entire surface of flat substrate 7. Here, optical adhesive 6 is applied to fill the inside of filter insertion groove 1 formed in the previous step. Coupling loss between fibers can be reduced by using optical adhesive 6 having refractive index equivalent to that of the Core material of optical fiber 5. The following steps shown in FIGS. 6E and 6F are the same manufacturing method as those shown in FIG. 3.

The above description refers to an example of using optical fiber for optical path 5. The same applies to other optical paths such as optical waveguides. A manufacturing method for the case when optical path 5 is the optical waveguide is shown in FIGS. 7A–7F. Steps shown in FIGS. 7A to 7F are the same as those shown in FIG. 6 except that optical waveguide 12 is used instead of optical fiber 5, and thus their description is omitted here.

Next, a manufacturing method shown in FIGS. 8A to 8G is described. Precise V-groove 10 is created on the surface of flat substrate 7 in a first step shown in FIG. 8A. Flat substrate 7 is preferably made of a material having a linear expansion coefficient equivalent to that of optical fiber 5 which is mounted and fixed in a later step.

Figure 8A:
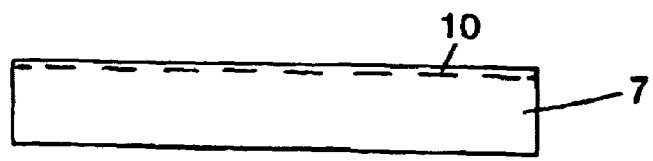
FIGS. 8A to 8G are sectional views illustrating a method of manufacturing an optical filter module in accordance with the third exemplary embodiment of the present invention.
Figure 8B:
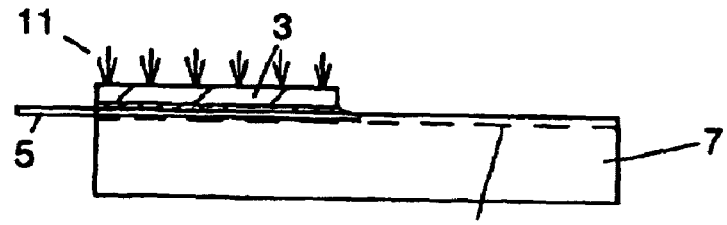

In a second step, optical fiber 5 is mounted and fixed on flat substrate 7, and cover 3 is attached, as shown in FIG. 8B. A mounted portion of optical fiber 5 is preferably the Clad portion where the covering is removed in order to secure the mounting accuracy. The angle and depth of V-groove 10 are set such that optical fiber 5 when mounted and fixed protrudes from the surface of flat substrate 7. This facilitates positioning of cover 3 by using protruding optical fiber 5 as a guide rail. In addition, the use of an expanded Core fiber as optical fiber 5 enlarges the spot size on the end face of optical fiber 5, reducing transmission loss and coupling loss between optical fibers 5. When optical adhesive is used, cover 3 can be fixed by irradiating typically UV ray or applying heat from one or both sides of cover 3 and flat substrate 7 so as to cure the adhesive. In this exemplary embodiment, photocurable optical adhesive is used, and the light is irradiated so as to cure the adhesive. It is preferable to choose a material with optical transparency for flat substrate 7 and cover 3, taking into account the use of photocurable adhesive for fixing.

Figure 8C:
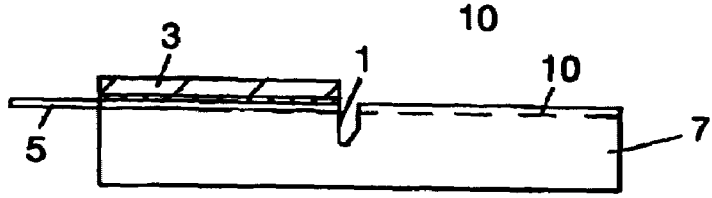

In a third step, as shown in FIG. 8C, filter insertion groove 1 is created on the surface of flat substrate 7, where optical fiber 5 is mounted and fixed, in a way such that filter insertion groove 1 crosses optical fiber 5. If the expanded Core fiber is used for optical fiber 5, filter insertion groove 1 is created such that groove 1 crosses the maximum core portion of the expanded Core. Filter insertion groove 1 is, for example, ground using a grinder which employs c-BN (cubic boron nitride) or diamond formed into a groove shape as abrasive grains. Alternatively, powder processing, such as using blast, is also applicable. If silicon is used as a material for the flat substrate, a groove can also be created by wet etching or dry etching.

As described in the first exemplary embodiment, the use of a grinder is more advantageous since it offers more flexibility in shape for processing the cross sectional face of filter insertion groove 1 into an irregular shape. Optical fiber 5 can be cut at the same time while forming filter insertion groove 1. When optical fiber 5 is cut simultaneously, positioning of the end face of optical fiber 5 and filter insertion groove 1 is eliminated, reducing the manufacturing time. To improve the surface roughness of the end face of cut optical fiber 5, abrasive grain is preferably as small as possible, if machining is chosen for creating filter insertion groove 1. The present invention thus uses a diamond grinder for creating filter insertion groove 1. A mirror-like end face of optical fiber 5 is mostly achieved by selecting a diamond grinder of #3000 or finer abrasive grains. Filter insertion groove 1 can be created aligned with the end face of cover 3. Alternatively, a part of cover 3 can be cut as filter insertion groove 1 is created. Cutting of cover 3 at the same time eliminates positioning of cover 3 and the end face of filter insertion groove 1, reducing the manufacturing time.

Figure 8D:
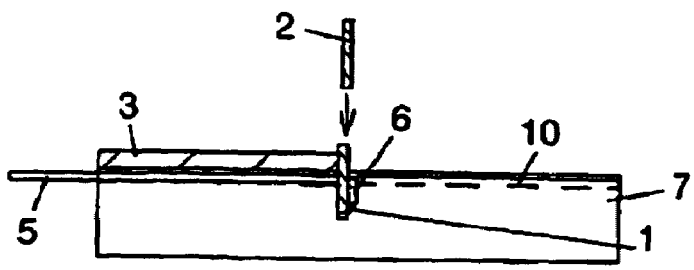

Next, in a fourth step, as shown in FIG. 8D, optical adhesive 6 is applied to the surface of flat substrate 7, and then multilayer filter 2 is inserted. Here, optical adhesive 6 is applied to fill the inside of filter insertion groove 1 formed in the previous step. Coupling loss between optical fibers can be reduced by using optical adhesive 6 having refractive index equivalent to that of the Core material of optical fiber 5.

Figure 8E:
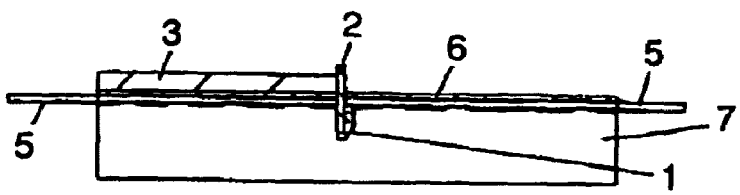
Figure 8F:
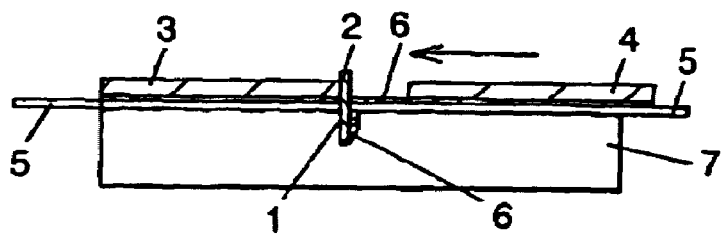
Figure 8G:
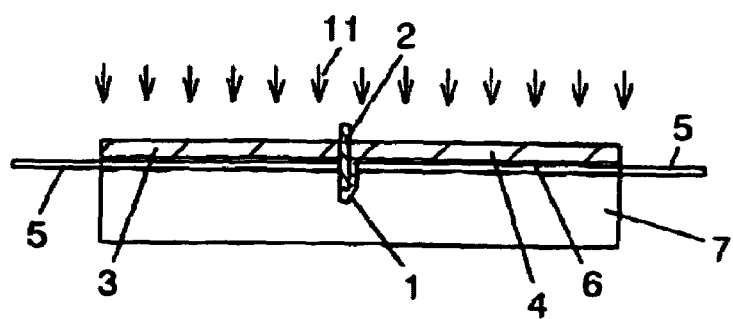
Figure 9:
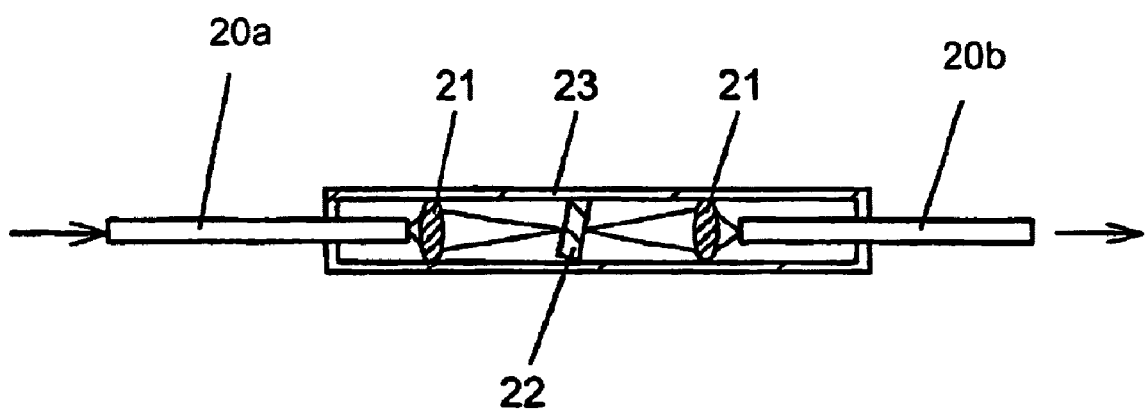
FIG. 9 is a section view of a structure of a conventional optical filter module.

Subsequent steps shown in FIGS. 8E to 8G are the same as those in the manufacturing method shown in FIGS. 5E to 5G.

INDUSTRIAL APPLICABILITY

As described above, the present invention is made by inserting a multilayer filter into a flat substrate having an optical path, filter insertion groove, and cover, and fixing the multilayer filter with another cover. This eliminates the optical axis adjustment required in the prior art. Consequently, the structure of optical filter module and bonding method of the present invention give improved operability, and also ensure the fixing and mounting of the multilayer filter, regardless of any warpage of the multilayer filter.

The invention claimed is:

1. An optical filter module comprising:
   a flat substrate;
   an optical path formed on said flat substrate;
   a filter insertion groove provided on said flat substrate, said filter insertion groove crossing said optical path;
   a multilayer filter inserted into said filter insertion groove, said multilayer filter dividing said optical path; and
   a first cover and a second cover disposed on said flat substrate, said first cover and said second cover sandwiching said multilayer filter,
   wherein at least one of said first cover and said second cover has an end face which is approximately flush with a wall of said filter insertion groove, and
   wherein at least one of said first cover and said second cover has an end face intimately contacting one face of said multilayer filter.

2. The optical filter module as defined in claim 1,
   wherein said filter insertion groove has a first wall and second wall facing a side face of said multilayer filter, and
   wherein an angle formed by said first wall and said side face of said multilayer filter is smaller than an angle formed by said second wall and said side face of said multilayer filter at a position where a bottom of said multilayer filter contacts said filter insertion groove.

3. The optical filter module as defined in claim 1,
   wherein said optical path is an optical fiber, and
   wherein said optical fiber is housed in a groove created on said flat substrate.

4. The optical filter module as defined in claim 3, wherein said optical fiber has an expanded Core.

5. The optical filter module as defined in claim 4, wherein an end face of divided optical fiber is the expanded Core.

6. The optical filter module as defined in claim 3,
   wherein a depth of said groove housing said optical fiber is smaller than a diameter of said optical fiber, and
   wherein each of said first cover and said second cover has a groove at a position contacting said optical fiber.

* * * * *